(12) United States Patent
Andre et al.

(10) Patent No.: US 11,996,513 B2
(45) Date of Patent: May 28, 2024

(54) METHOD FOR OPERATING A LITHIUM ION BATTERY, LITHIUM ION BATTERY, AND MOTOR VEHICLE

(71) Applicant: Bayerische Motoren Werke Aktiengesellschaft, Munich (DE)

(72) Inventors: Dave Andre, Munich (DE); Christoph Bauer, Herrsching (DE); Simon Nuernberger, Bad Aibling (DE); Jakub Reiter, Munich (DE); Sebastian Scharner, Tuerkenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 734 days.

(21) Appl. No.: 17/050,290

(22) PCT Filed: Mar. 29, 2019

(86) PCT No.: PCT/EP2019/058023
§ 371 (c)(1),
(2) Date: Oct. 23, 2020

(87) PCT Pub. No.: WO2019/206563
PCT Pub. Date: Oct. 31, 2019

(65) Prior Publication Data
US 2021/0126280 A1   Apr. 29, 2021

(30) Foreign Application Priority Data
Apr. 25, 2018   (DE) ................... 10 2018 206 383.4

(51) Int. Cl.
*H01M 10/0525*   (2010.01)
*H01M 10/0567*   (2010.01)
(Continued)

(52) U.S. Cl.
CPC ... *H01M 10/0525* (2013.01); *H01M 10/0567* (2013.01); *H01M 10/0568* (2013.01);
(Continued)

(58) Field of Classification Search
CPC .......... H01M 10/0525; H01M 10/615; H01M 10/625; H01M 10/654; H01M 10/0567;
(Continued)

(56) References Cited

U.S. PATENT DOCUMENTS 6,506,516 B1    1/2003   Wietelmann et al.
9,502,708 B2    11/2016  Wang et al.
(Continued)

FOREIGN PATENT DOCUMENTS

CN    101710631 A    5/2010
CN    102089924 A    6/2011
(Continued)

OTHER PUBLICATIONS

International Search Report (PCT/ISA/210) issued in PCT Application No. PCT/EP2019/058023 dated Jun. 11, 2019 with English translation (six (6) pages).
(Continued)

*Primary Examiner* — James M Erwin
(74) *Attorney, Agent, or Firm* — Crowell & Moring LLP

(57) ABSTRACT

A method is provided for operating a lithium ion battery having at least one lithium ion cell and a heating device, the method includes a step of operating the lithium ion battery in a temperature range between 5 and 90° C. The heating device is designed to operate the lithium ion battery in a temperature range between 5 and 90° C. The lithium ion cell includes an anode, a cathode, a separator, a current collector and an electrolyte. The electrolyte can contain LiBOB as the conducting salt and at least one solvent selected from propylene carbonate and ethylene carbonate; or having
(Continued)

LiFSI and/or LiDFOB as the conducting salt and at least one solvent selected from glycol ether and/or DMC; or having LiFSI and/or LiTFSI and/or LiDFOB and/or LiTDI as the conducting salt and at least one solvent selected from imidazolium compounds, pyrrolidinium compounds and piperidinium compounds.

7 Claims, 1 Drawing Sheet

(51) Int. Cl.
  *H01M 10/0568* (2010.01)
  *H01M 10/0569* (2010.01)
  *H01M 10/42* (2006.01)
  *H01M 10/615* (2014.01)
  *H01M 10/625* (2014.01)
  *H01M 10/654* (2014.01)

(52) U.S. Cl.
  CPC ... *H01M 10/0569* (2013.01); *H01M 10/4235* (2013.01); *H01M 10/615* (2015.04); *H01M 10/625* (2015.04); *H01M 10/654* (2015.04); *H01M 2220/20* (2013.01); *H01M 2300/0028* (2013.01)

(58) Field of Classification Search
  CPC ......... H01M 10/0568; H01M 10/0569; H01M 10/4235; H01M 2220/20; H01M 2300/0028
  USPC .......................................................... 429/50
  See application file for complete search history.

(56) References Cited

U.S. PATENT DOCUMENTS

| | | | |
|---|---|---|---|
| 2006/0012342 A1* | 1/2006 | Kamenoff | H01M 10/637 320/153 |
| 2007/0099080 A1 | 5/2007 | Pickett, Jr. et al. | |
| 2009/0162754 A1* | 6/2009 | Cotton | H01M 10/052 429/309 |
| 2009/0286162 A1 | 11/2009 | Lamanna et al. | |
| 2010/0178555 A1 | 7/2010 | Best | |
| 2011/0151317 A1 | 6/2011 | Giroud et al. | |
| 2011/0269002 A1 | 11/2011 | Kanata et al. | |
| 2015/0000118 A1 | 1/2015 | Zhao et al. | |
| 2015/0140421 A1* | 5/2015 | Ihara | B60L 50/16 429/199 |
| 2016/0023563 A1* | 1/2016 | Wang | B60L 58/24 320/152 |
| 2016/0087307 A1 | 3/2016 | Burkhardt et al. | |
| 2016/0190642 A1 | 6/2016 | Fukunaga et al. | |
| 2016/0197377 A1* | 7/2016 | Braun | H01G 11/58 429/188 |
| 2016/0233549 A1 | 8/2016 | Tiruvannamalai et al. | |
| 2016/0268064 A1 | 9/2016 | Ishikawa et al. | |
| 2016/0293941 A1* | 10/2016 | Yamasaki | H01M 10/567 |
| 2017/0084949 A1 | 3/2017 | Yokoyama et al. | |
| 2017/0098858 A1 | 4/2017 | Kim et al. | |
| 2017/0288271 A1 | 10/2017 | Le | |
| 2017/0338534 A1 | 11/2017 | Sutherland et al. | |
| 2017/0346134 A1* | 11/2017 | Bandhauer | H01M 4/13 |
| 2017/0373284 A1 | 12/2017 | Durstock et al. | |

FOREIGN PATENT DOCUMENTS

| | | |
|---|---|---|
| CN | 103094610 A | 5/2013 |
| CN | 105680114 A | 6/2016 |
| CN | 106716705 A | 5/2017 |
| CN | 106935907 A | 7/2017 |
| CN | 107403951 A | 11/2017 |
| DE | 198 29 030 C1 | 10/1999 |
| DE | 10 2012 210 146 A1 | 12/2013 |
| JP | 2008-21569 A | 1/2008 |
| JP | 2010-282836 A | 12/2010 |
| JP | 2011-512014 A | 4/2011 |
| JP | 2015-37024 A | 2/2015 |
| JP | 5932220 B2 | 6/2016 |
| JP | 2016-207641 A | 12/2016 |
| KR | 10-2016-0041902 A | 4/2016 |
| KR | 10-2017-0039580 A | 4/2017 |
| KR | 10-1842572 B1 | 3/2018 |
| WO | WO 2009/102604 A1 | 8/2009 |
| WO | WO 2013/141242 A1 | 9/2013 |
| WO | WO 2017/073765 A1 | 5/2017 |

OTHER PUBLICATIONS

German-language Written Opinion (PCT/ISA/237) issued in PCT Application No. PCT/EP2019/058023 dated Jun. 11, 2019 (eight (8) pages).

German-language Search Report issued in German Application No. 10 2018 206 383.4 dated Apr. 1, 2019 with partial English translation (13 pages).

Korean-language Office Action issued in Korean Application No. 10-2020-7028894 dated Jun. 14, 2022 with English translation (10 pages).

Japanese-language Office Action issued in Japanese Application No. 2020-559386 dated May 10, 2023 with English translation (5 pages).

Liu Z. et al., "Functional Lithium Borate Salts and Their Potential Application in High Performance Lithium Batteries", Coordination Chemistry Reviews, 2015, pp. 56-73, vol. 292, Elsevier, XP055586030 (18 pages).

Yoon H. et al., "Physical Properties of High Li-Ion Content N-Propyl-N-Methylpyrrolidinium Bis(Fluorosulfonyl)Imide Based Ionic Liquid Electrolytes", Phys Chem Chem Phys, 2015, pp. 4656-4663, vol. 17, Royal Society of Chemistry, XP055592667 (eight (8) pages).

Weihua Q., et al.; "Application of Boron-Based Lithium Salts in Lithium Ion Battery", Progress in Chemisty, Mar. 2011, pp. 357-365, vol. 23, No. 2/3 with English Abstract (9 pages).

Chinese-language Office Action issued in Chinese Application No. 201980026928.8 dated Jan. 4, 2024 with English translation (26 pages).

Chengguo, Y. et al., "Elevated-Temperature Electrolytes for Li-Ion Batteries", Progress in Chemistry, Jan. 2013, pp. 54-59, vol. 25, No. 1, with partial English translation (6 pages).

Ping, L. et al., "Temperature sensitivity of lithium-ion battery: A review", J Automotive Safety and Energy, Sep. 15, 2014, pp. 224-237, vol. 5, No. 3, with partial English translation (14 pages).

* cited by examiner

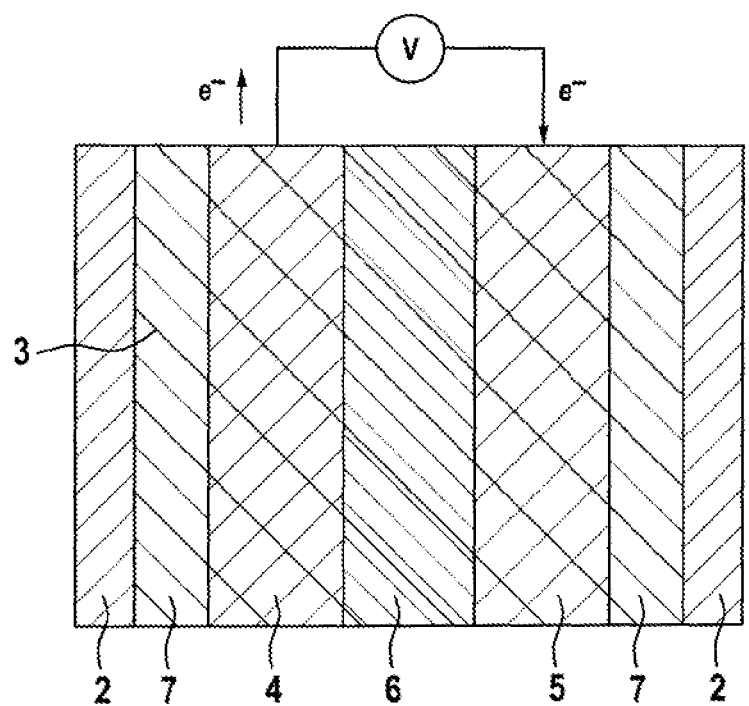

METHOD FOR OPERATING A LITHIUM ION BATTERY, LITHIUM ION BATTERY, AND MOTOR VEHICLE

BACKGROUND AND SUMMARY OF THE INVENTION

The present invention relates to a method for operating a lithium ion battery. The present invention also relates to a lithium ion battery and to a motor vehicle with a high level of safety during use and a long service life.

Lithium ion batteries have hitherto been designed for operation in a temperature range of −40° C. to +60° C. In order to avoid power losses at low temperatures, a heating system is used to bring the cell core to an appropriate temperature, as disclosed by way of example in DE 102012210146 A1. The lithium ion battery is also required to function at low temperatures, and it is therefore necessary to use low-boiling-point solvents which in turn at high temperatures have attendant disadvantages in overall safety of the battery, for example because of relatively high build-up of pressure and relatively high tendency toward formation of explosive air-solvent mixtures and the like. It is therefore necessary to use a cooling system. The overall effect is that construction of this type of lithium ion battery is very complicated and has associated risks relating to the safety, and therefore also the durability, of the lithium ion battery.

It is an object of the present invention to provide a method for operating a lithium ion battery, and also to provide a lithium ion battery, and a motor vehicle having such lithium ion battery, where these feature high user safety and long service life of the lithium ion battery together with simple structural design.

The object is therefore achieved via a process for the operation of a lithium ion battery which in particular is configured as lithium ion accumulator and which includes at least one lithium ion cell, mostly a plurality of stacked lithium ion cells, and one heating device. Each lithium ion cell further includes an anode, a cathode, a separator, a power outlet lead and an electrolyte. The heating device is equipped here to operate the lithium ion battery in a temperature range between 5 and 90° C.

In the invention, therefore, in particular by virtue of use of the heating device, the lithium ion cell is operated exclusively in a temperature range between 5 and 90° C., and in particular between 10 and 80° C. This means in other words that because of use of the process of the invention the lithium ion battery is operated only in favorable temperature ranges and is also designed only for that purpose. Many advantages are thus achieved: it is possible by way of example to use conductive salts which otherwise cannot be used at low temperatures. These often feature relatively high stability; this is reflected in a good long-term power yield of the lithium ion battery. It is also possible to use solvents that optimize safety, optimize lifetime, optimize voltage level and optimize costs.

The electrolyte therefore includes either LiBOB (lithium bisoxalatoborate) as the conductive salt and at least one solvent selected from: PC (propylene carbonate), EC (ethylene carbonate) and mixtures thereof. This electrolyte contains s no $LiPF_6$, which tends to form HF. User safety is thus improved. The solvents have high boiling points; this significantly increases safety during operation of the lithium ion battery. This electrolyte moreover has very good compatibility with graphite, which is mostly present in the electrodes of the battery, in particular on the anode side, and the lifetime of the lithium ion battery is thus increased. LiBOB moreover features high thermal stability; this likewise contributes to good lifetime of the lithium ion battery.

Alternatively, the electrolyte contains LiFSI (lithium bis(fluorosulfonyl)imidate) and/or LiDFOB (lithium difluorooxalatoborate) as the conductive salt and at least one glycol ether and/or DMC (dimethyl carbonate) as the solvent. It is also possible to use a plurality of glycol ethers. They can also be combined with DMC. Again, this electrolyte contains no $LiPF_6$, which tends to form HF, and user safety of the lithium battery is thus improved. The conductive salts used are moreover very stable. Glycol ethers and DMC usually have high boiling points; this is another factor that improves the lifetime and safety of the lithium ion battery.

In other alternatives, the electrolyte includes LiFSI (lithium bis(fluorosulfonyl)imidate) and/or LiTF SI (lithium bis(trifluoromethane)sulfoneimidate) and/or LiDFOB (lithium (difluorooxalatoborate) and/or LiTDI (lithium 4,5-dicyano-2-trifluoromethyl)imidazole as the conductive salt and includes at least one compound selected from: imidazolium compounds, pyrrolidinium compounds and piperidinium compounds as the solvent. It is therefore possible to use not only one or more imidazolium compounds, one or more pyrrolidinium compounds or one or more imidazolium compounds but also any desired combinations of these compounds as the solvent. The abovementioned solvents feature low vapor pressures, are incombustible up to about 200° C. and have high flashpoints. Use of this electrolyte therefore significantly increases user safety and the lifetime of the lithium ion battery. Again, this electrolyte contains no $LiPF_6$, which tends to form HF, and user safety of the lithium ion battery is thus further improved. The conductive salts moreover feature high thermal stability; this also contributes to good thermal stability of the lithium ion battery.

The method of the invention therefore permits operation of a lithium ion battery with high user safety level, good thermal stability and therefore very good durability of the battery at high power density and voltage level. Because operation of the lithium ion battery is designed for a temperature range of 5 to 90° C., there is no need for a cooling system; this significantly simplifies the method. This provides further possibilities for selection of material and design of the lithium ion battery.

An advantageous further development provides that when the electrolyte contains LiFSI and/or LiDFOB as the conductive salt and at least one glycol ether and/or DMC as the solvent, the total concentration of the conductive salts is more than 3 M to 10 M, preferably 4 M to 7 M. This improves the power density of the lithium ion battery, with very good long-term stability.

Because of very good stability on exposure to thermal stress, and good availability, the glycol ether is preferably selected from: 1,1-dimethoxyethane, 1,2-dimethoxyethane, bis(2-methoxyethyl) ether and mixtures thereof.

For further improvement of thermal stability, the imidazolium compounds, pyrrolidinium compounds and piperidinium compounds have a fluorinated anion.

Because of low vapor pressure, high flashpoint and low combustibility, it is particularly advantageous that the pyrrolidinium compound is 1-propyl-1-methylpyrrolidinium bis(fluorosulfonyl)imide.

User safety can, furthermore, be improved via the advantageous further development in which the electrolyte is free from fluorinated conductive salts, in particular from $LiPF_6$.

For reasons of increase of long-term stability, before the lithium ion battery enters operation, the electrolyte further advantageously includes at least one corrosion-protection additive, in particular at least one fluorine-containing corrosion-protection additive. The person skilled in the art can select suitable corrosion-protection additives here from commercially available corrosion-protection additives. In particular, small quantities of $LiPF_6$, i.e., at most 3% by weight, based on the entire composition of the electrolyte, can be used as corrosion-protection additive for aluminum. During the operation of the lithium ion battery, all of the $LiPF_6$ here is consumed for the formation of a corrosion-protection layer on aluminum-containing surfaces, for example the casing or the power outlet leads, and the $LiPF_6$ is therefore not an ongoing constituent of the electrolyte.

For further simplification of conduct of the method, the heating device is a heating device situated within the cell. This means that the heating device is arranged directly within the interior of the cell between, for example, what are known as jelly rolls or electrode stacks, in a manner that significantly facilitates introduction of heat at high efficiency. Alternatively, the heating device can also be arranged externally on the cell casing; by analogy with the heating system situated within the cell, the heating energy here comes from the cell itself. The heating device can by way of example be configured in the form of heating mats.

Another aspect of the invention relates to a lithium ion battery which in particular is configured as lithium ion accumulator and which comprises at least one lithium ion cell and one heating device, in particular in the form of a heating device situated within the cell, where the heating device is equipped to operate the lithium ion battery in a temperature range between 5 and 90° C., where the lithium ion cell includes an anode, a cathode, a separator, a power outlet lead and an electrolyte, and where the electrolyte contains LiBOB as a conductive salt and at least one selected from: PC and EC as the solvent or having LiFSI and/or LiDFOB as the conductive salt and at least one glycol ether and/or DMC as the solvent, or having LiFSI and/or LiTFSI and/or LiDFOB and/or LiTDI as the conductive salt and at least one compound selected from: imidazolium compounds, pyrrolidinium compounds and piperidinium compounds as the solvent. By virtue of use of the heating device, the lithium ion battery of the invention is in particular operated in a temperature range of 5 to 90° C., in particular of 10 to 80° C., and by virtue of the electrolyte designed in the invention in combination with the heating device features high user safety level, long service life and a high degree of freedom in respect of design and of materials, together with high power density.

For supplementary information in relation to advantages, advantageous effects and explanations, we refer to the statements made relating to the method of the invention for the operation of a lithium ion battery. We moreover wish to indicate that the method of the invention is suitable for use by means of the lithium ion battery of the invention and, respectively, the lithium ion battery is suitable for implementation of the method of the invention. The advantages, advantageous effects and further developments are therefore used in reciprocal fashion.

Another aspect described for the invention is a motor vehicle which includes a lithium ion battery of the type disclosed above. The motor vehicle features high long-term performance and safe use. By virtue of the heating device provided, there is no need for cooling of the lithium ion battery, and there is therefore also no requirement for provision of a cooling circuit which could adversely affect the compactness of the motor vehicle.

Further details, features and advantages of the invention are apparent from the description below and from the FIGURE.

BRIEF DESCRIPTION OF THE DRAWINGS

The FIGURE shows a diagrammatic sectional view of a lithium ion battery of one embodiment of the invention.

The FIGURE show only the essential features of the present invention. All other features are omitted in the interest of simplicity.

DETAILED DESCRIPTION OF THE DRAWINGS

In detail, the FIGURE shows a lithium ion battery 1 which in particular is configured as lithium ion accumulator, and which includes a lithium ion cell and a heating device 2. The heating device 2 is configured in the form of a heating device situated within the cell. It is self-evident here that a lithium ion battery can include a plurality of, in particular stacked, lithium ion cells.

The lithium ion cell includes an anode 4, a cathode 5, a separator 6, power outlet lead 7, and an electrolyte 3. The anode 4 and the cathode 5 are configured in conventional manner and usually include a carbon support material. The electrolyte 3 can be present in the anode 4, in the cathode 5 and in the separator 6 and optionally also in the separators 7, and includes LiBOB as the conductive salt and at least one solvent selected from PC and EC; mixtures of PC and EC can also be used here. Alternatively, the electrolyte 3 can include LiFSI and/or LiDFOB as the conductive salt and at least one glycol ether and/or DMC as the solvent or LiFSI and/or LiTFSI and/or LiDFOB and/or LiTDI as the conductive salt and at least one compound selected from: imidazolium compounds, pyrrolidinium compounds and piperidinium compounds as the solvent. The lithium ion battery 1 of the invention is usually arranged in a casing and is in particular operated via use of the heating device 2 in a temperature range of 5 to 90° C., in particular in the range of 10 to 80° C.

By virtue of the correct use of the lithium ion battery 1 and of the specifically designed electrolyte 3, it is possible to achieve high user safety level, long lifetime and a high degree of freedom in respect of design and materials, together with high power density. By virtue of compact structure, very good thermal stability, high user safety level and high durability together with very good power density, the lithium ion battery 1 is in particular suitable for use in a motor vehicle.

LIST OF REFERENCE SIGNS

1 Lithium ion battery
2 Heating device
3 Electrolyte
4 Anode
5 Cathode
6 Separator
7 Power outlet lead

What is claimed is:
1. A method for operating a lithium ion battery, the method comprising a step of operating the lithium ion battery in a temperature range between 5 and 90° C.,
wherein the lithium ion battery comprises at least one lithium ion cell and one heating device, wherein the heating device is equipped to operate the lithium ion battery in a temperature range between 5 and 90° C., wherein the lithium ion cell comprises an anode, a cathode, a separator, a power outlet lead and an electrolyte, and wherein the electrolyte comprises:

a conductive salt selected from lithium bis(fluorosulfonyl)imidate and/or lithium bis(trifluoromethane)sulfoneimidate and/or lithium (difluorooxalatoborate) and/or lithium (4,5-dicyano-2-trifluoromethyl)imidazole and at least one solvent selected from pyrrolidinium compounds, wherein the pyrrolidinium compound is 1-propyl-1-methylpyrrolidinium bis(fluorosulfonyl)imide.

2. The method according to claim 1, wherein the pyrrolidinium compounds have a fluorinated anion.

3. The method according to claim 1, wherein the electrolyte is free from fluorinated conductive salts.

4. The method according to claim 1, wherein, before the lithium ion battery enters operation, the electrolyte further comprises at least one fluorine-containing corrosion-protection additive.

5. The method according to claim 1, wherein the heating device is a heating device situated within the cell.

6. A lithium ion battery comprising at least one lithium ion cell and one heating device, wherein the heating device is equipped to operate the lithium ion battery in a temperature range between 5 and 90° C., wherein the lithium ion cell comprises an anode, a cathode, a separator, a power outlet lead and an electrolyte, wherein the electrolyte comprises:

a conductive salt selected from lithium bis(fluorosulfonyl)imidate and/or lithium bis(trifluoromethane)sulfoneimidate and/or lithium (difluorooxalatoborate) and/or lithium (4,5-dicyano-2-trifluoromethyl)imidazole and at least one solvent selected from pyrrolidinium compounds, wherein the pyrrolidinium compound is 1-propyl-1-methylpyrrolidinium bis(fluorosulfonyl)imide.

7. A motor vehicle comprising the lithium ion battery according to claim 6.

* * * * *